(12) United States Patent
Morisaku et al.

(10) Patent No.: US 10,483,517 B2
(45) Date of Patent: Nov. 19, 2019

(54) BUS BAR ASSEMBLY STRUCTURE AND BATTERY MODULE

(71) Applicant: KABUSHIKI KAISHA TOYOTA JIDOSHOKKI, Aichi-ken (JP)

(72) Inventors: Naoto Morisaku, Aichi-ken (JP); Fumihiko Ishiguro, Aichi-ken (JP); Hiromi Ueda, Aichi-ken (JP); Hirokuni Akiyama, Aichi-ken (JP); Takayuki Kato, Aichi-ken (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 0 days.

(21) Appl. No.: 16/302,357

(22) PCT Filed: Apr. 26, 2017

(86) PCT No.: PCT/JP2017/016538
§ 371 (c)(1),
(2) Date: Nov. 16, 2018

(87) PCT Pub. No.: WO2017/203925
PCT Pub. Date: Nov. 30, 2017

(65) Prior Publication Data
US 2019/0280278 A1    Sep. 12, 2019

(30) Foreign Application Priority Data

May 24, 2016 (JP) .................. 2016-103588

(51) Int. Cl.
*H01M 2/20* (2006.01)
*H01M 2/30* (2006.01)
(Continued)

(52) U.S. Cl.
CPC ............ *H01M 2/206* (2013.01); *F16B 37/00* (2013.01); *H01M 2/1077* (2013.01); *H01M 2/26* (2013.01); *H01M 2/30* (2013.01); *H01R 4/30* (2013.01)

(58) Field of Classification Search
None
See application file for complete search history.

(56) References Cited

U.S. PATENT DOCUMENTS

| 4,832,551 A | 5/1989 | Wollar |
| 6,877,997 B2 | 4/2005 | Schäty |
| 2012/0129041 A1 | 5/2012 | Komazawa |

FOREIGN PATENT DOCUMENTS

| CN | 102468473 | 5/2012 |
| DE | 39 00 527 | 7/1989 |

(Continued)

OTHER PUBLICATIONS

International Search Report issued in WIPO Patent Application No. PCT/JP2017/016538, dated Jun. 20, 2017, along with an English translation thereof.

(Continued)

*Primary Examiner* — Jonathan Crepeau
(74) *Attorney, Agent, or Firm* — Greenblum & Bernstein, P.L.C.

(57) ABSTRACT

A bus bar assembly structure includes an electrode terminal and a plate-shaped bus bar that is assembled to the electrode terminal. The bus bar has a burr along an edge of one of openings of an insertion hole. A threaded portion of a nut has a tapered portion at an edge of one of openings of the threaded portion, and a largest diameter of the tapered portion is greater than a bore diameter of the insertion hole.

(Continued)

A flat portion of the bus bar is held between a bolt and a nut while the burr is located within a space created by the tapered portion.

6 Claims, 8 Drawing Sheets

(51) Int. Cl.
    *F16B 37/00*     (2006.01)
    *H01R 4/30*     (2006.01)
    *H01M 2/10*     (2006.01)
    *H01M 2/26*     (2006.01)

(56) References Cited

FOREIGN PATENT DOCUMENTS

| | | |
|---|---|---|
| DE | 10 2013 217 464 | 3/2015 |
| JP | 64-35215 | 3/1989 |
| JP | 09-166120 | 6/1997 |
| JP | 2000-192928 | 7/2000 |
| JP | 2011-258450 | 12/2011 |

OTHER PUBLICATIONS

Written Opinion of the International Searching Authority issued in WIPO Patent Application No. PCT/JP2017/016538, dated Jun. 20, 2017, along with an English translation thereof.

BUS BAR ASSEMBLY STRUCTURE AND BATTERY MODULE

CROSS REFERENCE TO RELATED APPLICATION

This application is a National Stage of International Application No. PCT/JP2017/016538 filed Apr. 26, 2017, claiming priority based on Japanese Patent Application No. 2016-103588 filed May 24, 2016, the contents of all of which are incorporated herein by reference in their entirety.

TECHNICAL FIELD

The present invention relates to a bus bar assembly structure and a battery module.

BACKGROUND ART

The technique in the technical field of the present invention includes, for example, a battery connecting assembly disclosed in Patent Document 1. The conventional battery connecting assembly is configured to connect electrode terminals of a plurality of battery cell groups to each other, and includes bus bars each having a pair of insertion holes through which the electrode terminals are inserted. The insertion holes of the bus bars are formed by punching holes in the bus bars, which involves formation of a burr along the edge of one of the openings of each insertion hole. Thus, in the conventional battery connecting assembly, a cutout is provided to each bus bar so that the front and rear surfaces of the bus bar are distinguishable, and an electrode terminal is inserted into each insertion hole from the side of the bus bar having the edge of the other of the openings that is free from burrs.

PRIOR ART DOCUMENT

Patent Document

Patent Document 1: Japanese Patent Application Publication No. 2011-258450

SUMMARY OF INVENTION

Problem that the Invention is to Solve

The bus bar assembly structure also includes an assembly structure formed by fastening a bus bar with fastening members, such as bolts and nuts, after electrode terminals are inserted through the insertion holes of the bus bar. In such structure, if burrs are present along the edges of the openings of the insertion holes of the bus bar, the burrs may be sandwiched at the fastened portions. When the burrs are sandwiched at the fastened portions, the axial tension of the fastening members may lower to loosen the tightened fasteners, or an electrical contact failure may occur between the bus bar and the electrode terminals. Although the burrs on the bus bar may be removed by chamfering or may be finished by pressing, there is a fear that the process of assembling bus bars becomes complicated and the cost for the process is increased.

The present invention has been made to solve the above problem, and it is an objective of the present invention to provide a bus bar assembly structure and a battery module that can prevent loosening of tightened fasteners due to lowered axial tension and an electrical contact failure between the bus bar and electrode terminals, even if burrs are present on the bus bar.

Solution to Problem

A bus bar assembly structure according to an aspect of the present invention includes an electrode terminal and a plate-shaped bus bar that is assembled to the electrode terminal. The bus bar includes a flat portion having an insertion hole through which the electrode terminal is inserted, and a bent portion that protrudes from one side of the flat portion. The electrode terminal includes an externally threaded fastener that includes a shaft portion to be inserted through the insertion hole, and an internally threaded fastener that has a threaded portion in an inner peripheral side thereof to be screwed on a tip of the shaft portion extending out from the insertion hole. The bus bar has a burr along an edge of one of openings of the insertion hole. The internally threaded fastener has a tapered portion at an edge of one of openings of the threaded portion, and the tapered portion has a largest diameter that is greater than a bore diameter of the insertion hole. The flat portion of the bus bar is held between the externally threaded fastener and the internally threaded fastener while the burr is located within a space created by the tapered portion.

In the bus bar assembly structure, the internally threaded fastener has a tapered portion at an edge of one of openings of the threaded portion, and the tapered portion has a largest diameter that is greater than a bore diameter of the insertion hole of the bus bar. Furthermore, the flat portion of the bus bar is held between the externally threaded fastener and the internally threaded fastener while the burr is located within a space created by the tapered portion. In this structure, the burr on the bus bar is not sandwiched directly between the externally threaded fastener and the internally threaded fastener. Therefore, it is possible to prevent the loosening of the fasteners due to the lowered axial tension and the electrical contact failure between the bus bar and the electrode terminal.

Furthermore, in the bus bar, the bent portion may protrude from a same side of the bus bar as the burr, and in the electrode terminal, the externally threaded fastener may form a base and the threaded portion of the internally threaded fastener may be screwed on the shaft portion. In this case, since the direction of inserting the externally threaded fastener through the insertion hole may be determined by the orientation of the burr, it is possible to prevent incorrect orientation of the bus bar or the like when assembling the bus bar.

Furthermore, in the bus bar, the bent portion may protrude from the other side of the bus bar that is opposite to the side that has the burr, and in the electrode terminal, the internally threaded fastener may form a base, and the shaft portion of the externally threaded fastener may be screwed into the threaded portion. In this case, since the direction of inserting the externally threaded fastener through the insertion hole may be determined by the orientation of the burr, it is possible to prevent incorrect orientation of the bus bar or the like when assembling the bus bar.

Furthermore, the flat portion of the bus bar may be held together with a ring terminal of a harness between the externally threaded fastener and the internally threaded fastener, and the ring terminal may have an inner diameter that is greater than the largest diameter of the tapered portion. In the case of assembling a ring terminal of a harness with the bus bar, by setting the inner diameter of the ring terminal to be greater than the largest diameter of the tapered portion of the internally threaded fastener, it is possible to enhance the ease of assembling of the ring terminal to the shaft portion of the externally threaded fastener.

Furthermore, the flat portion of the bus bar may be held together with a ring terminal of a harness between the externally threaded fastener and the internally threaded fastener, and the ring terminal may have an inner diameter that is smaller than the largest diameter of the tapered portion. In the case of assembling a ring terminal of a harness with the bus bar, by setting the inner diameter of the ring terminal to be smaller than the largest diameter of the tapered portion of the internally threaded fastener, it is possible to hold the ring terminal firmly with a seating surface of the internally threaded fastener.

Furthermore, a battery module according to an aspect of the present invention includes an array in which a plurality of battery cells is arranged, and electrode terminals of adjacent battery cells are connected to each other by the above-described bus bar assembly structure.

In this battery module, the burr on the bus bar is not sandwiched directly between the externally threaded fastener and the internally threaded fastener. Therefore, it is possible to prevent the loosening of the fasteners due to the lowered axial tension and the electrical contact failure between the bus bar and the electrode terminals.

Advantageous Effects of Invention

According to the present invention, it is possible to prevent the loosening of the fasteners due to the lowered axial tension and the electrical contact failure between the bus bar and the electrode terminals, even if burrs are present on the bus bar.

DESCRIPTION OF EMBODIMENTS

The following will describe a preferred embodiment of a bus bar assembly structure and a battery module according to an aspect of the present invention, with reference to the drawings.

Overall Configuration of the Battery Module

Figure 1:
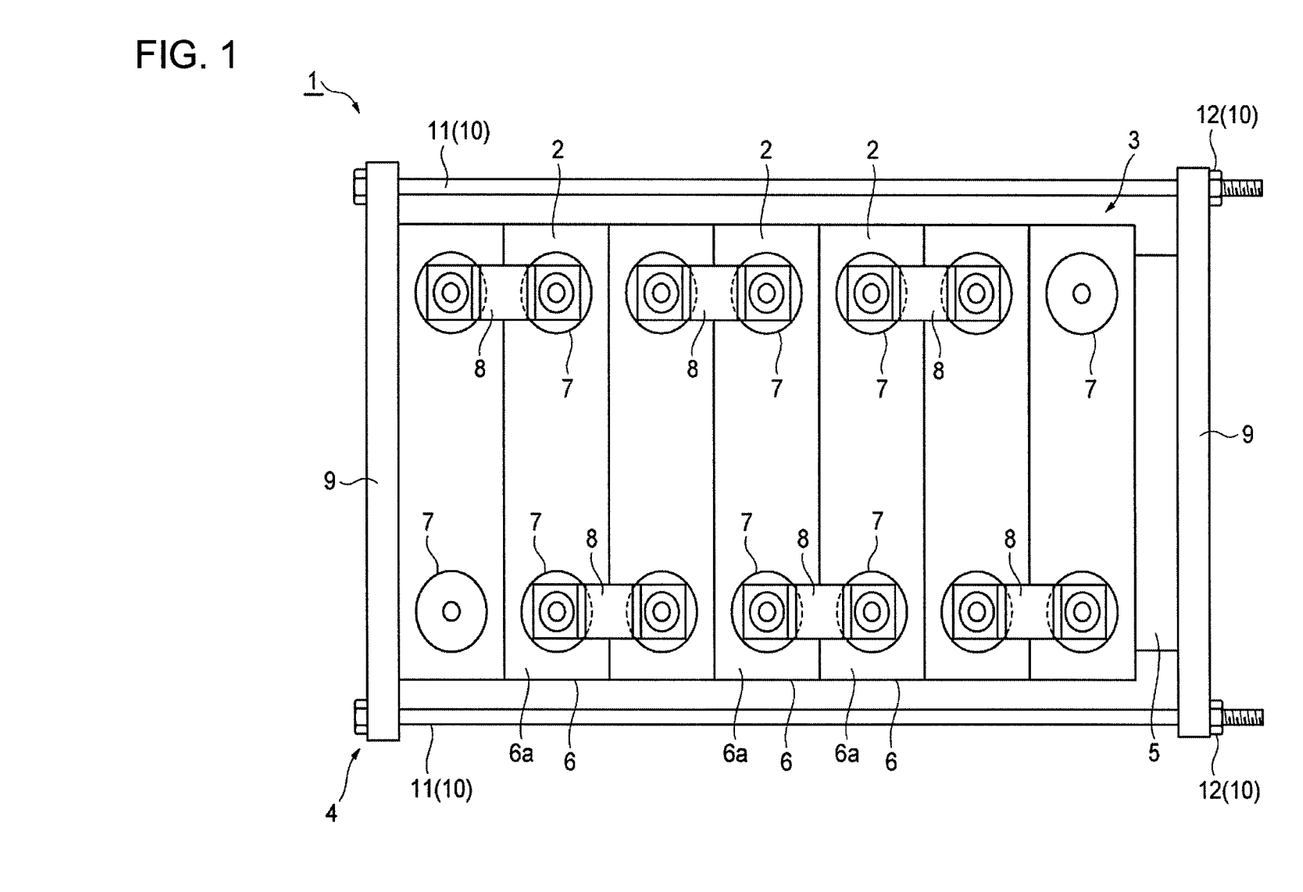
FIG. 1 is a schematic view showing an embodiment of a battery module.

FIG. 1 is a schematic view showing an embodiment of the battery module. As shown in FIG. 1, a battery module 1 includes an array 3 in which a plurality of battery cells 2 is arranged, a binding member 4 that applies a binding load on the array 3 in an arranging direction of the battery cells 2, and an elastic body 5 that is interposed between the array 3 and the binding member 4.

The array 3 includes, for example, seven pieces of battery cells 2. A thermal conduction plate, which is not shown, is interposed between adjacent battery cells 2, 2. The battery cells 2 are lithium-ion rechargeable batteries, for example. Each battery cell 2 is formed by installing an assembly of electrodes in a hollow casing 6 having, for example, a substantially rectangular parallelepiped shape, and charging electrolyte into the casing 6.

A pair of electrode terminals 7, 7 is disposed on a top surface 6a of the casing 6 such that the electrode terminals 7, 7 are separated from each other. One of the electrode terminals 7, 7 is a cathode terminal connected to a cathode of the electrode assembly, and the other of the electrode terminals 7, 7 is an anode terminal connected to an anode of the electrode assembly. Adjacent battery cells 2, 2 are arranged such that the cathode and the anode are located next to each other, and the neighbouring cathode and anode are connected via a bus bar 8, so that the battery cells 2, 2 are electrically connected in series.

The binding member 4 includes a pair of end plates 9, 9, and a plurality of fastening members 10 for fastening the end plates 9, 9 to each other. The end plates 9 are formed in a flat plate shape and made of a metal, such as iron, and disposed such that the end plates 9, 9 sandwich the array 3 and the elastic body 5 in the arranging direction.

Each fastening member 10 includes a long-sized connecting bolt 11 and a nut 12 that is to be screwed on the connecting bolt 11. The connecting bolts 11 are inserted from one end plate 9 to the other end plate 9 such that outer edges of the end plates 9, 9 are connected to each other. By screwing the nuts 12 on the tips of the connecting bolts 11 from the outside of the end plate 9, the battery cells 2, the elastic body 5, and the thermal conduction plates are held between the pair of end plates 9, 9 and formed into a unit and, at the same time, a binding load is applied to the unit.

The elastic body 5 is used for preventing any damage to the battery cells 2 that results from the binding load and also for preventing any damage to the binding member. The elastic body 5 is, for example, a rubber sponge made of urethane and has a shape of a rectangular plate. The elastic body 5 is disposed next to the battery cell 2 that is located at one end of the array 3 in the arranging direction. Examples of other materials for the elastic body 5 include an ethylene-propylene-diene rubber (EPDM), a chloroprene rubber, and a silicone rubber. The elastic body 5 is not limited to the rubber member, and may be a spring member or the like.

First Embodiment of the Bus Bar Assembly Structure

The following will describe in detail the assembly structure of the bus bar 8 with the electrode terminals 7 that has been described above.

Figure 2:
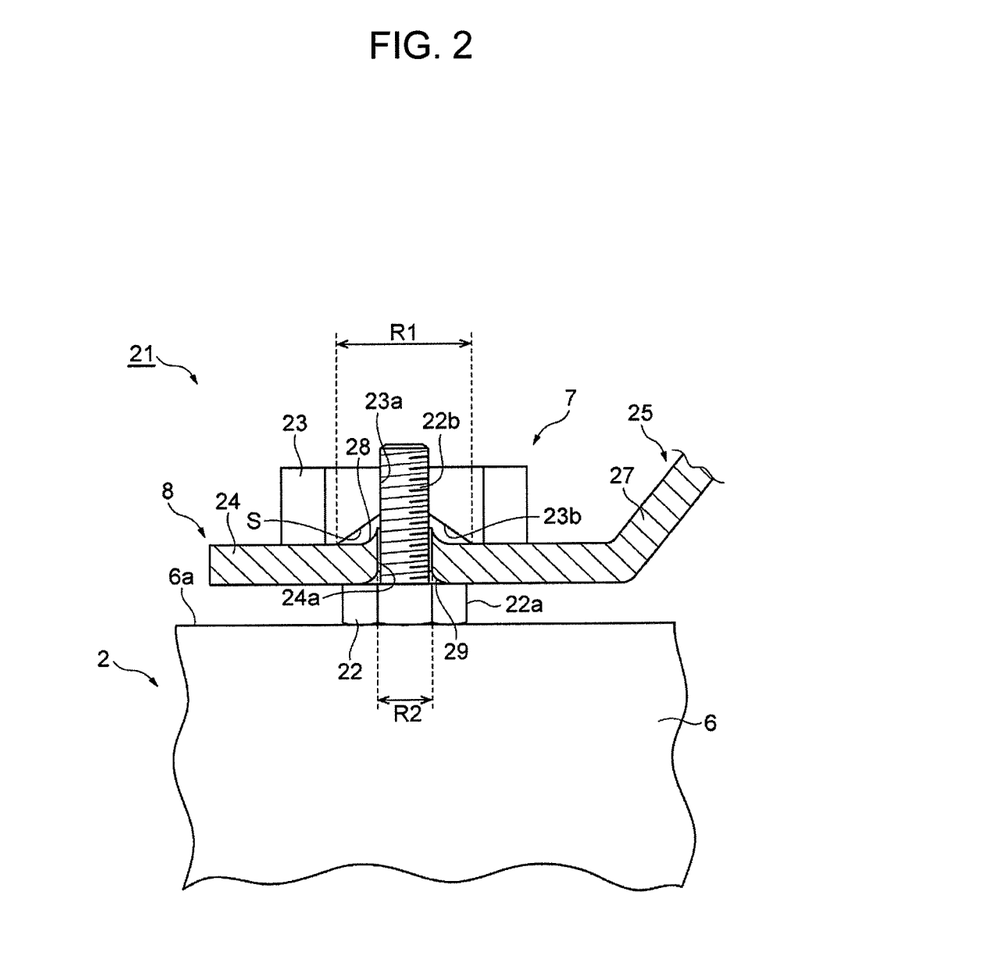
FIG. 2 is a cross-sectional view showing a bus bar assembly structure according to a first embodiment.

FIG. 2 is a cross-sectional view showing a bus bar assembly structure according to a first embodiment. As shown in FIG. 2, in a bus bar assembly structure 21 according to the first embodiment, each electrode terminal 7 includes a bolt (an externally threaded fastener) 22 and a nut (an internally threaded fastener) 23. The bolt 22 includes a head portion 22a and a shaft portion 22b. The bolt 22 forms a base of the electrode terminal 7. In other words, the bolt 22 is fixed to the casing 6 of the battery cell 2 such that the head portion 22a contacts the top surface 6a of the casing 6, and the shaft portion 22b extends from the top surface 6a at a substantially right angle.

Each nut 23 has a threaded portion 23a on an inner peripheral side thereof. The nut 23 has a tapered portion 23b, which is not threaded, at the edge of one of the openings of the threaded portion 23a. In the present embodiment, the tapered portion 23b has a substantially conical shape. The tapered portion 23b is in communication with the threaded portion 23a. The diameter of the opening of the tapered portion 23b increases outwardly so that the diameter is largest at the opening end face. A largest diameter R1 of the tapered portion 23b is sufficiently greater than a bore diameter R2 of insertion holes 24a of the bus bar 8, which will be described later.

Figure 3:
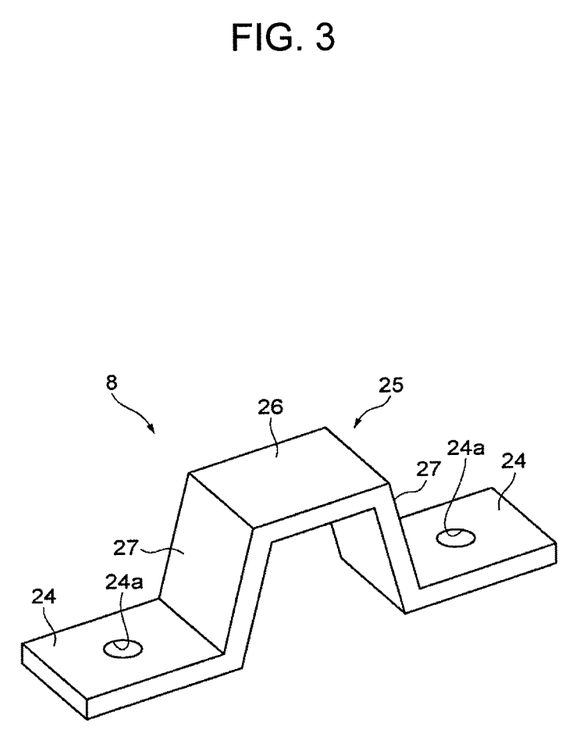
FIG. 3 is a perspective view showing an example of a bus bar.

The bus bar 8 is formed in a plate shape and made of a metal, such as a copper, which has a good electrical conductivity. As shown in FIG. 3, the bus bar 8 includes a pair of flat portions 24, 24 and a bent portion 25. The flat portions 24 are to be fixed to the electrode terminals 7 and form opposite end portions of the bus bar 8 in the longitudinal direction of the bus bar 8. Each flat portion 24 has at the center thereof the insertion hole 24a through which one of the electrode terminals 7 is inserted. The bore diameter R2 of the insertion holes 24a is slightly greater than the diameter of the shaft portions 22b of the bolts 22. Furthermore, the bore diameter R2 of the insertion holes 24a is sufficiently smaller than the largest diameter R1 of the tapered portions 23b of the nuts 23.

The bent portion 25 connects the pair of flat portions 24, 24 to each other. The bent portion 25 includes a top portion 26 that is substantially parallel with the flat portions 24, and a pair of tilt portions 27 that connects the top portion 26 with the flat portions 24. Thus, the bent portion 25 is formed to protrude from one side of the flat portions 24. The pair of flat portions 24, 24 is connected to each other by the bent portion 25. This configuration allows varying of the tilt angles of the tilt portions 27 with respect to the flat portions 24 and the top portion 26 when a force is applied in the longitudinal direction of the bus bar 8 (the direction in which the flat portions 24, 24 are connected to each other).

Since the tilt angle of the tilt portions 27 is made variable, the distance between the flat portions 24, 24 in the longitudinal direction of the bus bar 8 becomes variable. Thus, when an abnormality or the like has occurred and any battery cell 2 swells to increase the distance between the electrode terminals 7, 7 of adjacent battery cells 2, 2, the configuration enables the positions of the insertion holes 24a, 24a to change with the increase of the distance between the electrode terminals 7, 7. With this operation, it is possible to prevent the bus bar 8 from being damaged by an excessive force due to the swollen battery cell 2.

The above-described insertion holes 24a of the flat portions 24 are formed by shearing, such as punching. Therefore, as shown in FIG. 2, a burr 28 is formed along the edge of one of the openings of each insertion hole 24a, and a rollover 29 is formed along the edge of the other of the openings of the insertion hole 24a. In the present embodiment, the direction in which the bent portion 25 protrudes form the flat portions 24, 24 and the direction in which the burrs 28 extend around the insertion holes 24a are the same. In other words, in the bus bar 8, the bent portion 25 protrudes from the same side of the bus bar 8 as the burrs 28.

In the bus bar assembly structure 21, the bus bar 8 is disposed to extend between the electrode terminals 7, 7 such that the bent portion 25 protrudes in a direction away from the battery cells 2. The shaft portion 22b of one of the electrode terminals 7, 7 is inserted through one of the insertion holes 24a of the bus bar 8, and the shaft portion 22b of the other of the electrode terminals 7, 7 is inserted through the other of the insertion holes 24a. By screwing the nuts 23 on the tips of the shaft portions 22b extending out from the insertion holes 24a, the bus bar 8 is firmly fixed to the electrode terminals 7, 7.

More specifically, in the bus bar assembly structure 21, the burr 28 that is formed along the edge of one of the openings of each insertion hole 24a extends toward the nut 23, while the rollover 29 that is formed along the edge of the other of the openings of the insertion hole 24a faces the head portion 22a of the bolt 22. Furthermore, the nut 23 is screwed on the tip of the shaft portion 22b such that the tapered portion 23b faces the flat portion 24 of the bus bar 8. Therefore, the tapered portion 23b creates a space S between the flat portion 24 and the nut 23 and around the shaft portion 22b, and the burr 28 that is formed along the edge of one of the openings of the insertion hole 24a is located within the space S.

In the present embodiment, assuming that the diameter of the shaft portion 22b of the bolt 22 is A, the difference between the diameter of the insertion hole 24a of the bus bar 8 and the diameter of the shaft portion 22b (the largest clearance between the peripheral surface of the shaft portion 22b and the inner peripheral surface of the insertion hole 24a) of the bolt 22 is B, and the diameter that is a sum of the bore diameter R2 of the insertion hole 24a and the width of the burr 28 is C, then the largest diameter R1 of the tapered portion 23b of the nut 23 satisfies at least R1>C, and, more preferably, satisfies R2>A+B+C. Furthermore, according to the present embodiment, assuming that the height of the tapered portion 23b is E, and the height of the burr 28 is F, then the relation of E>F is satisfied.

As described above, in the bus bar assembly structure 21, each nut 23 has the tapered portion 23b at the edge of one of the openings of the threaded portion 23a, and the tapered portion 23b has the largest diameter R1 that is greater than the bore diameter R2 of the insertion holes 24a of the bus bar 8. Furthermore, each flat portion 24 of the bus bar 8 is held between the bolt 22 and the nut 23 while the burr 28 is located within the space S created by the tapered portion 23b. In such structure, the burrs 28 of the bus bar 8 are not sandwiched directly between the bolts 22 and the nuts 23. Therefore, it is possible to prevent the loosening of the fasteners due to the lowered axial tension and the electrical contact failure between the bus bar 8 and the electrode terminals 7.

Furthermore, in the bus bar assembly structure 21, in the bus bar 8, the bent portion 25 protrudes from the same side of the bus bar 8 as the burrs 28. In each electrode terminal 7, the bolt 22 forms the base and the threaded portion 23a of the nut 23 is screwed on the shaft portion 22b to thereby hold the corresponding flat portion 24 of the bus bar 8. According to the configuration, the direction of inserting the bolts 22 through the insertion holes 24a may be determined by the orientation of the burrs 28. When the bus bar 8 is set ono the electrode terminals 7, by inserting the shaft portions 22b of the bolts 22 through the insertion holes 24a from the opening edges of the insertion holes 24a having the rollovers 29, the ease of insertion of the shaft portions 22b through the insertion holes 24a is ensured. Furthermore, the burrs 28 serve as marks that indicate the orientation of the bus bar 8, which may prevent incorrect orientation of the bus bar 8 (or the orientation of the bent portion 25) or the like when assembling the bus bar 8.

Modification of the First Embodiment of the Bus Bar Assembly Structure

Figure 4:
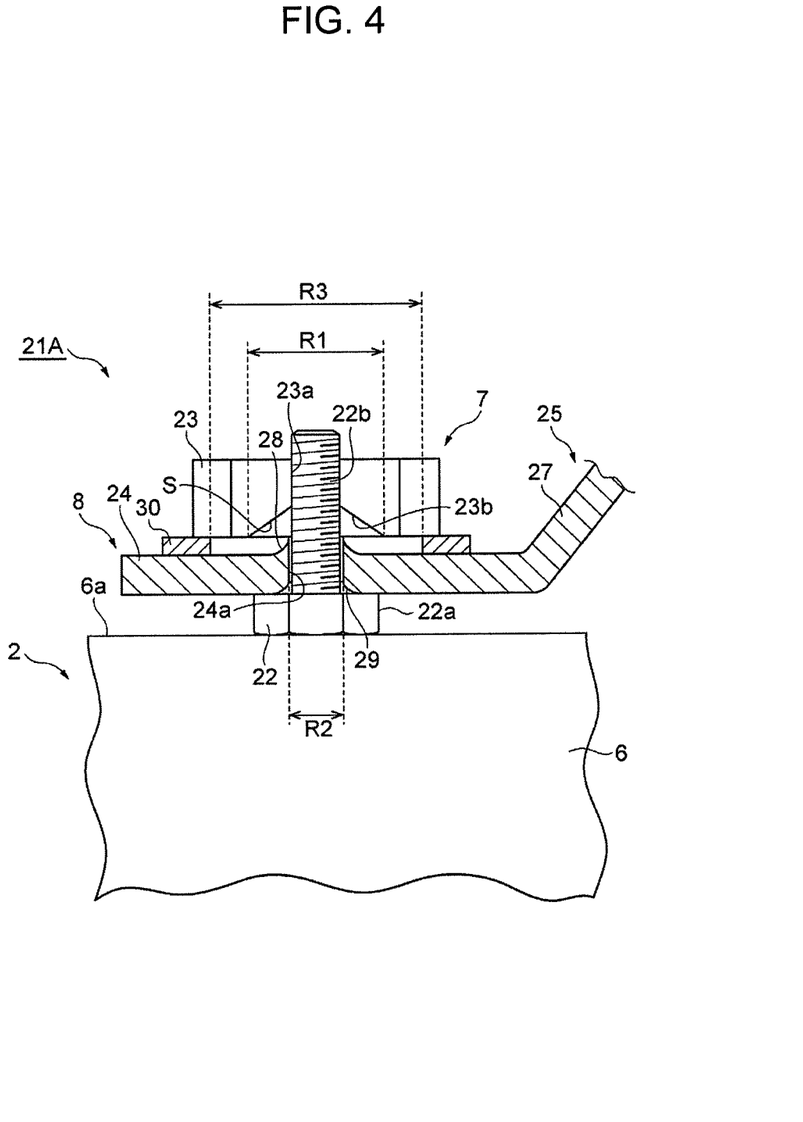
FIG. 4 is a cross-sectional view showing a modification of the first embodiment of the bus bar assembly structure.

FIG. 4 is a cross-sectional view showing a modification of the first embodiment of the bus bar assembly structure. As shown in FIG. 4, a bus bar assembly structure 21A according to the modification of the first embodiment differs from the embodiment shown in FIG. 2 in that a ring terminal 30 of a harness is further assembled to the electrode terminal 7.

The harnesses are used, for example, to detect voltage of the battery cells 2, and connected to specified electrode terminals 7 of the battery cells 2 in the battery module 1. Proximal end portions of the harnesses are bundled into a harness bundle and connected to an ECU (not shown) for monitoring voltage. In the bus bar assembly structure 21A, each ring terminal 30 is held between the flat portion 24 of the bus bar 8 and the nut 23. Each ring terminal 30 has an inner diameter R3 that is greater than the largest diameter R1 of the tapered portion 23b of the nut 23.

In the above-described bus bar assembly structure 21A, burrs 28 are also located within the spaces S created by the tapered portions 23b, so that burrs 28 of the bus bar 8 are prevented from being directly sandwiched between the bolts 22 and the nuts 23. Therefore, it is possible to prevent the loosening of the fasteners due to the lowered axial tension and the electrical contact failure between the bus bar 8 and the electrode terminals 7. Furthermore, since the direction of inserting the bolts 22 through the insertion holes 24a may be determined by the orientation of the burrs 28, it is possible to prevent incorrect orientation of the bus bar 8 (or the orientation of the bent portion 25) when assembling the bus bar 8.

Furthermore, in the bus bar assembly structure 21A, for the purpose of assembling the ring terminals 30 of the harnesses, the inner diameter R3 of the ring terminals 30 is greater than the largest diameter R1 of the tapered portions 23b. By setting the inner diameter R3 of the ring terminals 30 to be greater than the largest diameter R1 of the tapered portions 23b, the ease of assembling the ring terminals 30 to the shaft portions 22b of the bolts 22 is enhanced. Furthermore, since the inner diameter R3 of the ring terminals 30 is sufficiently large, it is possible to prevent the burrs 28 from contacting the ring terminals 30 and the electrical connection failure between the electrode terminals 7 and the ring terminals 30.

Figure 5:
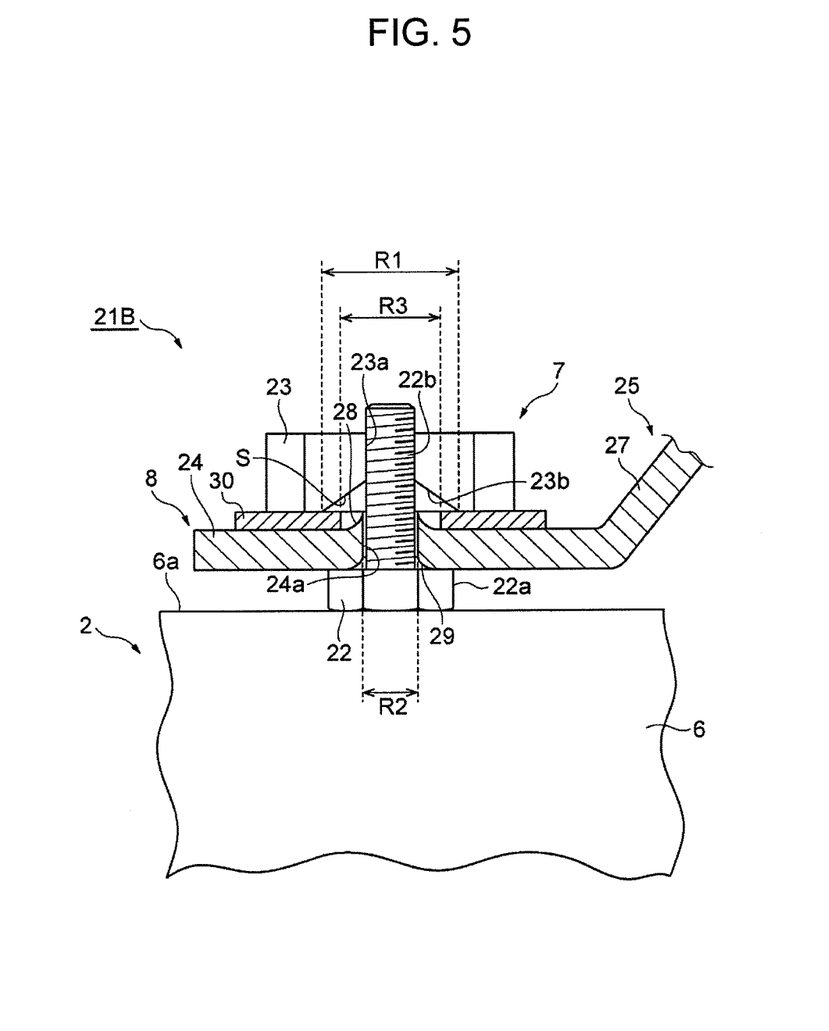
FIG. 5 is a cross-sectional view showing another modification of the first embodiment of the bus bar assembly structure.

It is to be noted that as is the case of a bus bar assembly structure 21B that is shown in FIG. 5, the inner diameter R3 of the ring terminals 30 may be smaller than the largest diameter R1 of the tapered portions 23b. In this case, it is possible to hold the ring terminals 30 firmly with the seating surfaces of the nuts 23. In this configuration, it is also preferable that the inner diameter R3 of the ring terminals 30 be of a size that does not substantially cause contact between the ring terminals 30 and the burrs 28.

Second Embodiment of the Bus Bar Assembly Structure

Figure 6:
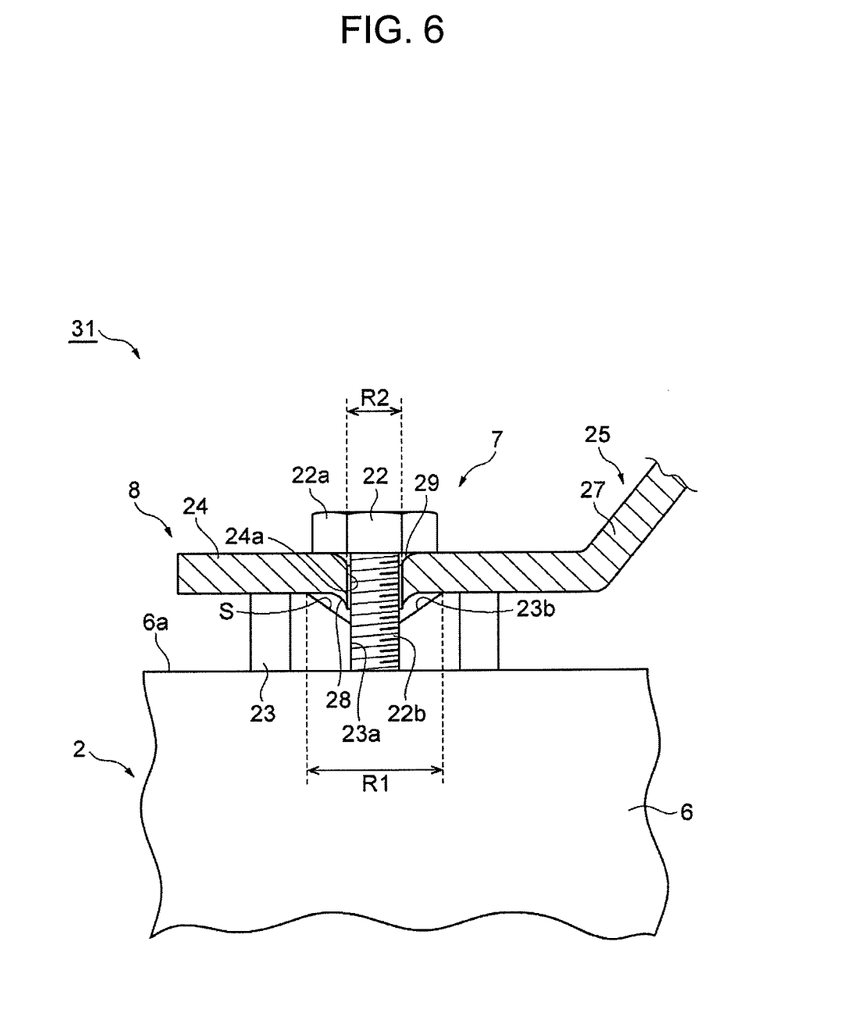
FIG. 6 is a cross-sectional view showing a bus bar assembly structure according to a second embodiment.

FIG. 6 is a cross-sectional view showing a bus bar assembly structure according to a second embodiment. As shown in FIG. 6, a bus bar assembly structure 31 according to the second embodiment differs from the bus bar assembly structure according to the first embodiment in the configuration of the electrode terminals 7, and the positional relationship between the burr 28 and the rollover 29 around each insertion hole 24a of the bus bar 8.

More specifically, in the bus bar assembly structure 31, the nuts 23 form the base of the electrode terminals 7. The nuts 23 are fixed to a top surface 6a of a casing 6 in such a manner that the tapered portions 23b face in a direction away from the top surface 6a.

Furthermore, in the bus bar assembly structure 31, the bent portion 25 protrudes from the other side of the bus bar 8 that is opposite to the side that has the burrs 28. In other words, in the bus bar 8, each insertion hole 24a has the rollover 29 along the edge of one of the openings thereof, and the burr 28 along the edge of the other of the openings thereof. The bus bar 8 is disposed to extend between the electrode terminals 7, 7 such that the bent portion 25 protrudes in a direction away from the battery cells 2 (in the direction in which the burrs 28 extend toward the nuts 23). The insertion holes 24a are aligned with the threaded portions 23a, and the shaft portions of the bolts 22 are screwed on the threaded portions 23a of the nuts 23, so that the bus bar 8 is firmly fixed to the electrode terminals 7, 7.

As is the case of the first embodiment, in the bus bar assembly structure 31, the burrs 28 are located within the spaces S created by the tapered portions 23b, so that the burrs 28 of the bus bar 8 are prevented from being directly sandwiched between the bolt 22 and the nut 23. Therefore, it is possible to prevent the loosening of the fasteners due to the lowered axial tension and the electrical contact failure between the bus bar 8 and the electrode terminals 7. Furthermore, since the direction of inserting the bolts 22 through the insertion holes 24a may be determined by the orientation of burrs 28, it is possible to prevent incorrect orientation of the bus bar 8 (or the orientation of the bent portion 25) or the like when assembling the bus bar 8.

Modification of the Second Embodiment of the Bus Bar Assembly Structure

Figure 7:
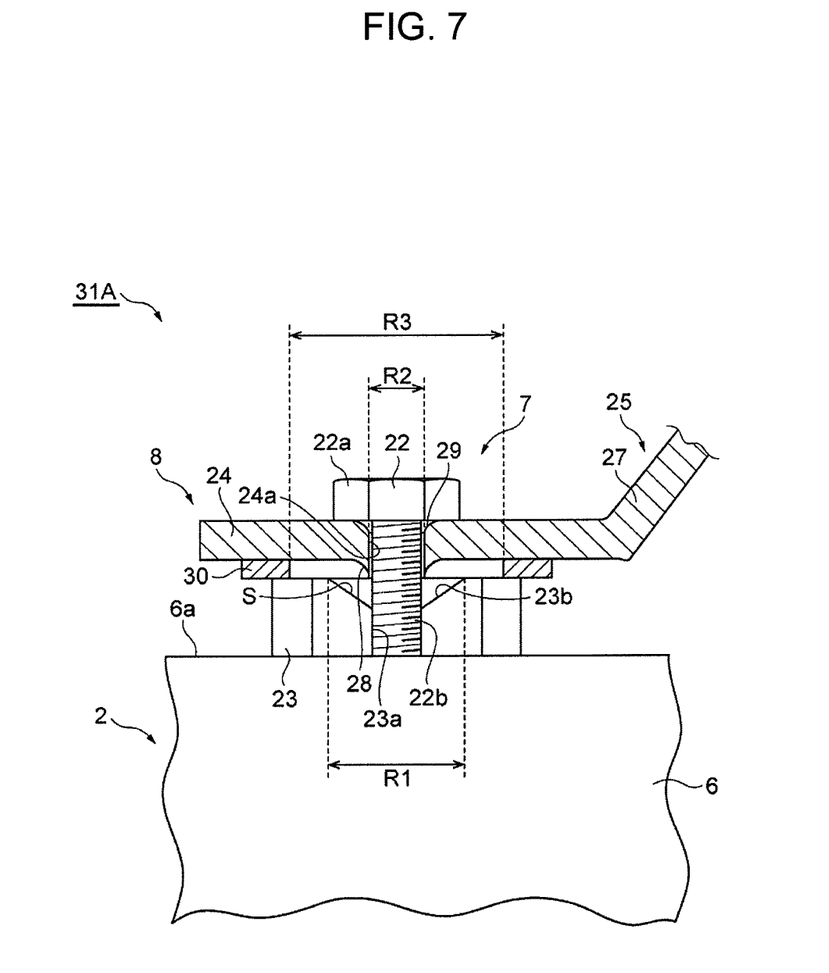
FIG. 7 is a cross-sectional view showing a modification of the second embodiment of the bus bar assembly structure.

FIG. 7 is a cross-sectional view showing a modification of the second embodiment of the bus bar assembly structure. As shown in FIG. 7, a bus bar assembly structure 31A according to the modification of the second embodiment differs from the embodiment that is shown in FIG. 6 in that a ring terminal 30 of a harness is further assembled to the electrode terminal 7. In the bus bar assembly structure 31A, the ring terminal 30 is held between the flat portion 24 of the bus bar 8 and the nut 23. Furthermore, the ring terminal 30 has an inner diameter R3 that is greater than the largest diameter R1 of the tapered portions 23b of the nuts 23.

In this bus bar assembly structure 31A, the burrs 28 are also located within the spaces S created by the tapered portions 23b, as is the case of the above-described embodiment, so that burrs 28 of the bus bar 8 are prevented from being directly sandwiched between the bolts 22 and the nuts 23. Therefore, it is possible to prevent the loosening of the fasteners due to the lowered axial tension and the electrical contact failure between the bus bar 8 and the electrode terminals 7. Furthermore, since the direction of inserting the bolts 22 through the insertion holes 24a may be determined by the orientation of the burrs 28, it is possible to prevent incorrect orientation of the bus bar 8 (or the orientation of the bent portion 25) or the like when assembling the bus bar 8. Furthermore, since the inner diameter R3 of the ring terminals 30 is sufficiently large, it is possible to prevent the burrs 28 from contacting the ring terminals 30, and the electrical connection failure between the electrode terminals 7 and the ring terminals 30.

Figure 8:
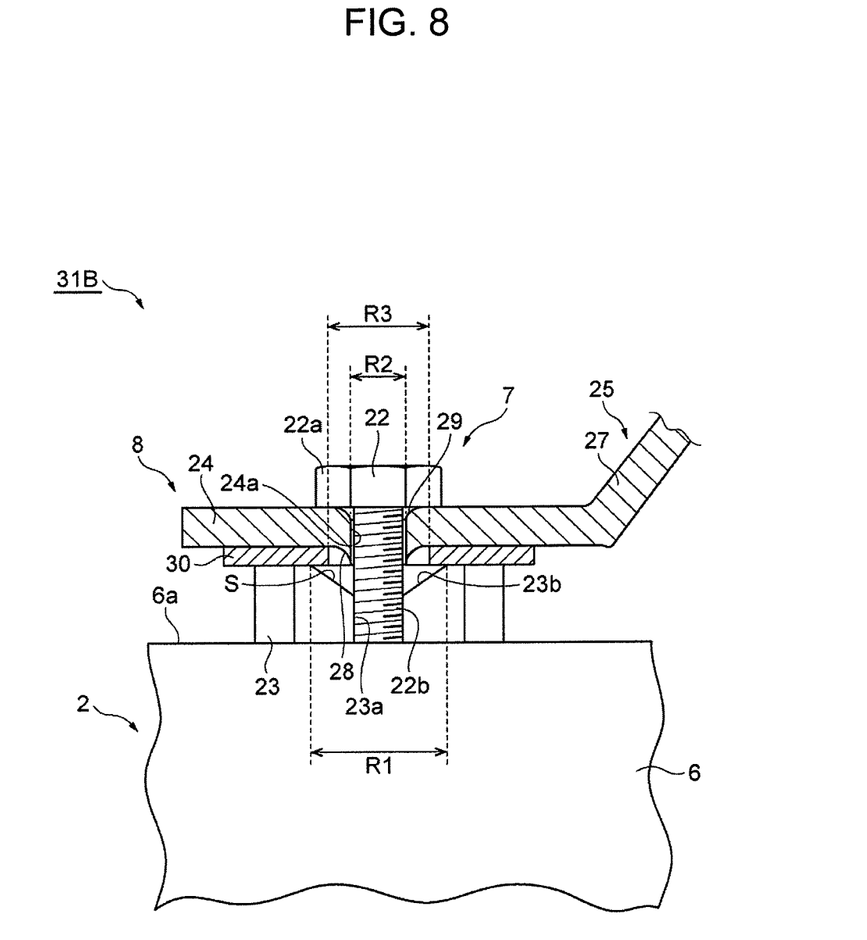
FIG. 8 is a cross-sectional view showing another modification of the second embodiment of the bus bar assembly structure.

It is to be noted that, as is the case of the bus bar assembly structure 31B shown in FIG. 8, the inner diameter R3 of the ring terminals 30 may be smaller than the largest diameter R1 of the tapered portions 23b. In this case, it is possible to hold the ring terminals 30 firmly with the seating surfaces of the nuts 23. In this configuration also, it is preferable that the inner diameter R3 of the ring terminals 30 be of a size that does not substantially cause contact between the ring terminals 30 and the burrs 28.

The present invention is not limited to the above embodiments. For example, in the above embodiments, the tapered portions 23b have a substantially conical shape. However, the tapered portions 23b may be of any shape as long as the tapered portions 23*b* have a largest diameter that is greater than the bore diameter of the insertion holes. For example, each tapered portion 23*b* may include one or more steps so that the diameter increases stepwise.

DESCRIPTION OF REFERENCE NUMERALS 1 battery module
2 battery cell
3 array
4 electrode terminal
8 bus bar
21, 21A, 21B, 31, 31A, 31B bus bar assembly structure
22 bolt (externally threaded fastener)
22*b* shaft portion
23 nut (internally threaded fastener)
23*a* threaded portion
23*b* tapered portion
24 flat portion
24*a* insertion hole
25 bent portion
28 burr
30 ring terminal
S space
R1 largest diameter of tapered portion
R2 bore diameter of insertion hole
R3 inner diameter of ring terminal

The invention claimed is:

1. A bus bar assembly structure comprising:
an electrode terminal; and
a plate-shaped bus bar that is assembled to the electrode terminal, wherein
the bus bar includes a flat portion having an insertion hole through which the electrode terminal is inserted, and a bent portion that protrudes from one side of the flat portion,
the electrode terminal includes an externally threaded fastener that includes a shaft portion to be inserted through the insertion hole, and an internally threaded fastener that has a threaded portion in an inner peripheral side thereof to be screwed on a tip of the shaft portion extending out from the insertion hole,
the bus bar has a burr along an edge of one of openings of the insertion hole,
the internally threaded fastener has a tapered portion at an edge of one of openings of the threaded portion, and the tapered portion has a largest diameter that is greater than a bore diameter of the insertion hole, and
the flat portion of the bus bar is held between the externally threaded fastener and the internally threaded fastener while the burr is located within a space created by the tapered portion.

2. The bus bar assembly structure according to claim 1, wherein
in the bus bar, the bent portion protrudes from a same side of the bus bar as the burr, and
in the electrode terminal, the externally threaded fastener forms a base and the threaded portion of the internally threaded fastener is screwed on the shaft portion.

3. The bus bar assembly structure according to claim 1, wherein
in the bus bar, the bent portion protrudes from the other side of the bus bar that is opposite to the side that has the burr, and
in the electrode terminal, the internally threaded fastener forms a base and the shaft portion of the externally threaded fastener is screwed into the threaded portion.

4. The bus bar assembly structure according to claim 1, wherein
the flat portion of the bus bar is held together with a ring terminal of a harness between the externally threaded fastener and the internally threaded fastener, and
the ring terminal has an inner diameter that is greater than the largest diameter of the tapered portion.

5. The bus bar assembly structure according to claim 1, wherein
the flat portion of the bus bar is held together with a ring terminal of a harness between the externally threaded fastener and the internally threaded fastener, and
the ring terminal has an inner diameter that is smaller than the largest diameter of the tapered portion.

6. A battery module comprising an array in which a plurality of battery cells is arranged, wherein
electrode terminals of adjacent battery cells are connected to each other by the bus bar assembly structure according to claim 1.

* * * * *